United States Patent [19]
Smith et al.

[11] Patent Number: 5,905,978
[45] Date of Patent: May 18, 1999

[54] WINDOW SIZE DETERMINATION USING FUZZY LOGIC

[75] Inventors: John H. Smith, West Chester, Pa.; Gerard O'Brien, Woodend, New Zealand

[73] Assignee: Unisys Corporation, Blue Bell, Pa.

[21] Appl. No.: 08/680,757

[22] Filed: Jul. 15, 1996

[51] Int. Cl.$^6$ ........................................... G06F 15/18
[52] U.S. Cl. .............................. 706/52; 706/8; 706/1
[58] Field of Search ........................ 395/61, 200.65; 370/232, 233, 231, 230, 389; 706/52, 8, 1; 707/201

[56] References Cited

U.S. PATENT DOCUMENTS

| | | | |
|---|---|---|---|
| 4,897,781 | 1/1990 | Chang et al. | 707/201 |
| 5,020,020 | 5/1991 | Pomfret et al. | 395/200.65 |
| 5,113,519 | 5/1992 | Johnson et al. | 707/201 |
| 5,119,367 | 6/1992 | Kawakstsu et al. | 370/232 |
| 5,151,989 | 9/1992 | Johnson et al. | 707/10 |
| 5,189,667 | 2/1993 | Esaki et al. | 370/389 |
| 5,199,027 | 3/1993 | Barri | 370/231 |
| 5,226,117 | 7/1993 | Miklos | 355/356 |
| 5,226,143 | 7/1993 | Baird et al. | 711/145 |
| 5,231,631 | 7/1993 | Buhrke et al. | 370/230 |
| 5,251,315 | 10/1993 | Wang | 707/8 |
| 5,341,366 | 8/1994 | Soumiya et al. | 370/233 |
| 5,361,199 | 11/1994 | Shoquist et al. | 705/26 |
| 5,388,255 | 2/1995 | Pytlik et al. | 707/4 |
| 5,418,912 | 5/1995 | Christenson | 395/200.64 |
| 5,446,733 | 8/1995 | Tsuruoka | 370/232 |
| 5,491,801 | 2/1996 | Jain et al. | 375/200.71 |
| 5,493,728 | 2/1996 | Solton et al. | 711/113 |

OTHER PUBLICATIONS

D. Brubaker et al., "Fuzzy–logic system solves control problem", EDN–Design Feature, pp. 121–126, Jun., 1992.

R. Velez, "An Intelligent Tool for UNIX Performance Tuning", IEEE, pp. 118–122, 1993.

E. Cox, "Fuzzy Fundamentals", IEEE Spectrum, pp. 58, 59, 61, Oct. 1992.

D. Conner, "Fuzzy–Logic Control System", EDN–Special Report, pp. 77–82, 84, 86, 88, Mar. 31, 1993.

*Primary Examiner*—Robert W. Downs
*Assistant Examiner*—Sanjiv Shah
*Attorney, Agent, or Firm*—John B. Sowell; Mark T. Starr; Steven B. Samuels

[57] ABSTRACT

A memory utilization value indicative of memory utilization associated with a data channel is received. A queue depth value indicative of the queue depth of messages located within a message queue maintained by the data channel is also received. A fuzzy logic design is executed with the memory utilization value in the queue depth value used as input parameters. A crisp value is then generated which corresponds to a window size of the data channel.

17 Claims, 9 Drawing Sheets

WINDOW SIZE DETERMINATION USING FUZZY LOGIC

FIELD OF THE INVENTION

The present invention relates to data channels and the efficient usage of data channels. In particular, a design is disclosed in which fuzzy logic evaluates data channel parameters so that window size can be varied to promote efficient data channel utilization.

BACKGROUND OF THE INVENTION

For a typical computer system to transfer data to a network, the data is packaged as messages and transferred to the network through an input/output (I/O) channel. The I/O channel is typically in the form of an I/O board. As messages are transferred from the computer processor to the I/O board, the messages wait in the I/O board until the network is ready to act on these messages. Thus, the I/O board includes a buffer memory to hold these messages before they are transmitted to the network.

Messages are typically stored in the buffer memory using a First-In-First-Out (FIFO) Queue data structure. Messages are received into this FIFO Queue from the computer system. Messages are removed from this FIFO Queue for transmission to the network.

Prior art computer processors transmit messages to the I/O board when the I/O board has room to accept these messages. If the buffer memory within the I/O board becomes completely filled, then the computer processor simply stops sending messages to the I/O board. The I/O board then continues to transmit messages to the network as quickly as the network accepts these messages. When the buffer memory within the I/O board achieves a certain level of memory availability, the computer processor resumes sending messages to the I/O board.

In effect, using this scheme, the buffer memory within the I/O board becomes flooded with messages. When the buffer memory within the I/O board reaches a certain level of memory availability, "flooding" of the I/O board resumes. Thus, the buffer memory within the I/O board experiences large transitions in its memory utilization.

There are numerous disadvantages in such erratic use of an I/O board. The I/O channel is being used inefficiently because the channel is varying with either extremely high traffic usage or no traffic usage. Furthermore, because the amount of message transmissions are not being accomplished at a smooth level, system performance is degraded. In addition, the need to constantly start and stop message transmission to the I/O board results in an increase to computer processor overhead. All of these attributes are undesirable with regard overall processor utilization.

SUMMARY OF THE INVENTION

A memory utilization value indicative of memory utilization associated with a data channel is received. A queue depth value indicative of the queue depth of messages located within a message queue maintained by the data channel is also received. A fuzzy logic design is executed with the memory utilization value and the queue depth value used as input parameters. A crisp value is then generated which corresponds to a window size of the data channel.

DETAILED DESCRIPTION OF THE INVENTION

As is well known in the art, fuzzy logic is a method of easily representing analog processes on a digital computer. The methodology is particularly useful with processes that are not easily broken down into discrete segments and where smooth transitions in operation are desired in response to variation of input parameters.

As an example of a fuzzy logic design, a fan speed controller is described. In particular, an example is provided of a fuzzy logic design which regulates fan speed in response to temperature variation.

Figure 1:
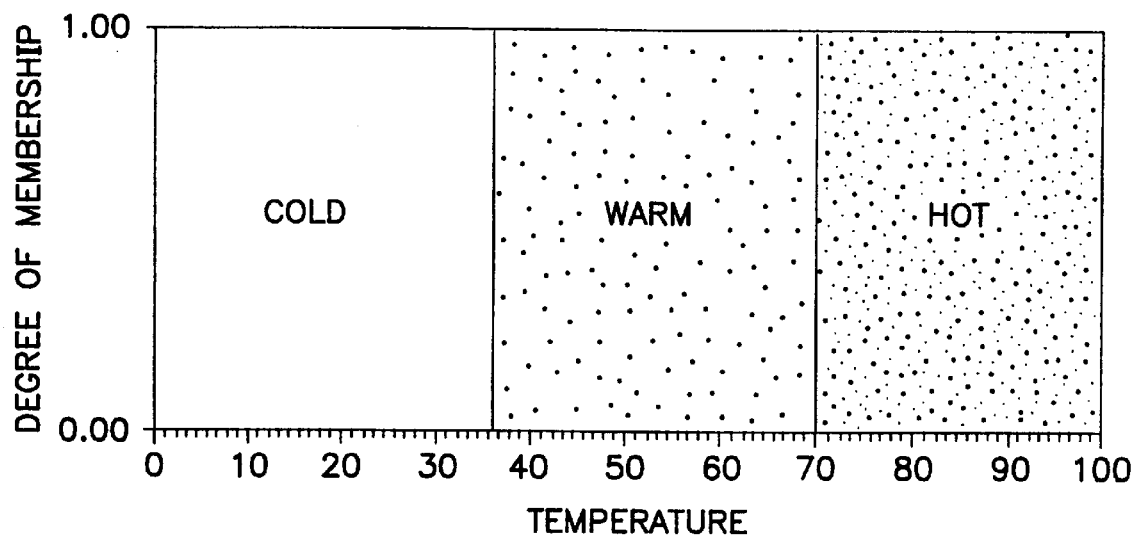
FIG. 1 is an illustration of crisp sets using conventional logic.

A fuzzy logic crisp set is a set in which membership of an element either exists or does not exist, i.e., there is no partial membership into such a set. FIG. 1 illustrates three crisp sets using conventional logic: cold, warm, and hot. Membership in the cold crisp set is obtained if the temperature input is between 0°–35°. Membership in the warm crisp set is obtained if the temperature input is between 35°–70°. Membership in the hot crisp set is obtained if the temperature input is between 70°–100°.

A truth value of membership indicates the degree of membership in a particular set. Truth values range between 0.00 (for total non-membership in a set) to 1.00 (for total membership in a set). Since FIG. 1 is illustrating crisp sets in which an input temperature value will be exclusively in one set, the possible truth values for the system defined by FIG. 1 will be either 0.00 (if the input temperature is not a member of that set) or 1.00 (if the input temperature is a member of the input set). For a temperature of 50°, for example, the degree of membership in the cold set is 0.00, the degree of membership in the warm set is 1.00, and the degree of membership in the hot set is 0.00.

Figure 2:
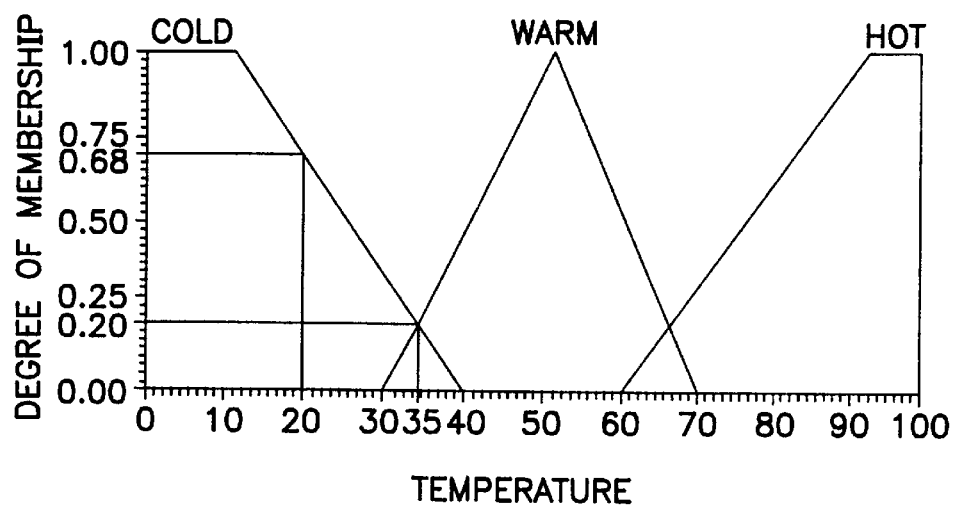
FIG. 2 is an illustration of a fuzzy input set to help illustrate the use of fuzzy input sets which are used to generate fuzzy logic designs.

A fuzzy set allows an element to have a degree of membership between 0.00 and 1.00. This is illustrated by FIG. 2. FIG. 2 illustrates a fuzzy input set again have three membership functions: cold, warm, and hot. Unlike FIG. 1, however, the degree of membership in any particular set may be a value between 0.00 and 1.00. For example, for an input temperature of 20°, the degree of membership in the cold set is 0.68, the degree of membership in the warm set is 0.00, and the degree of membership in the hot set is 0.00. Furthermore, for an input temperature of 35°, the degree of membership in the cold set is 0.20, the degree of membership in the warm set is 0.20, and the degree of membership in the hot set is 0.00. Thus, unlike the membership functions shown in FIG. 1, the membership functions shown in FIG. 2 are not crisp sets.

Figure 3:
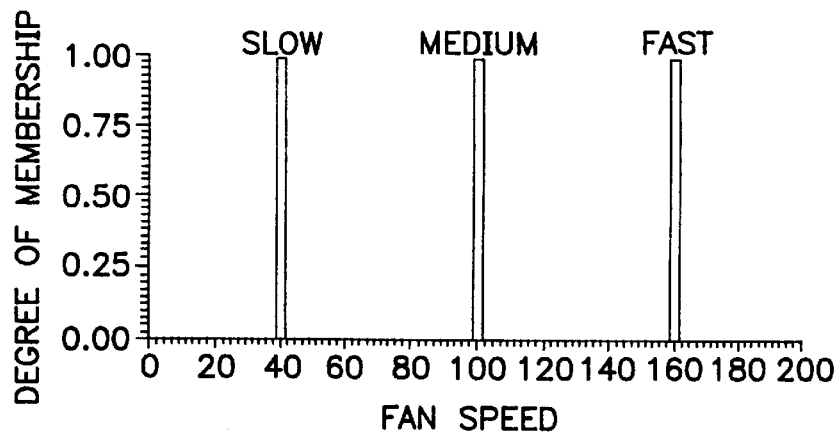
FIG. 3 is a diagram which illustrates a fuzzy logic output set, and which more particularly illustrates the use of singletons, to help explain the use of fuzzy logic in accordance with the present invention.

FIG. 3 illustrates a fuzzy output set including fuzzy output membership functions each represented as a single point. Each single point is called a singleton. Each singleton has a discrete value with a degree of membership of 1.00.

Rules define relationships between input fuzzy sets and output fuzzy sets. Rules are in the form of IF-THEN statements. Thus, for example, an exemplary rule statement is:

IF TEMPERATURE IS HOT,
THEN FAN SPEED IS FAST.

Using the fuzzy logic design illustrated by FIGS. 2–3, the degree of membership in each membership function is determined for an input temperature value. The rules are then evaluated. A rule applies when the degree of membership for a membership function included in a rule is greater than 0.00. If two logic rules exist, each based on a different input function, and the input value results in a degree of membership in both membership functions of greater than 0.00, both rules are evaluated.

Finally, a crisp value based on the rule strength of all logic rules that are evaluated for a particular input is generated. This crisp value is the output value which is used in the example illustrated by FIGS. 2–3 to vary fan speed to either slow, medium or fast.

Before describing an exemplary fuzzy logic design which may be used in accordance with the present invention, a brief description of I/O channel usage is provided.

Figure 4:
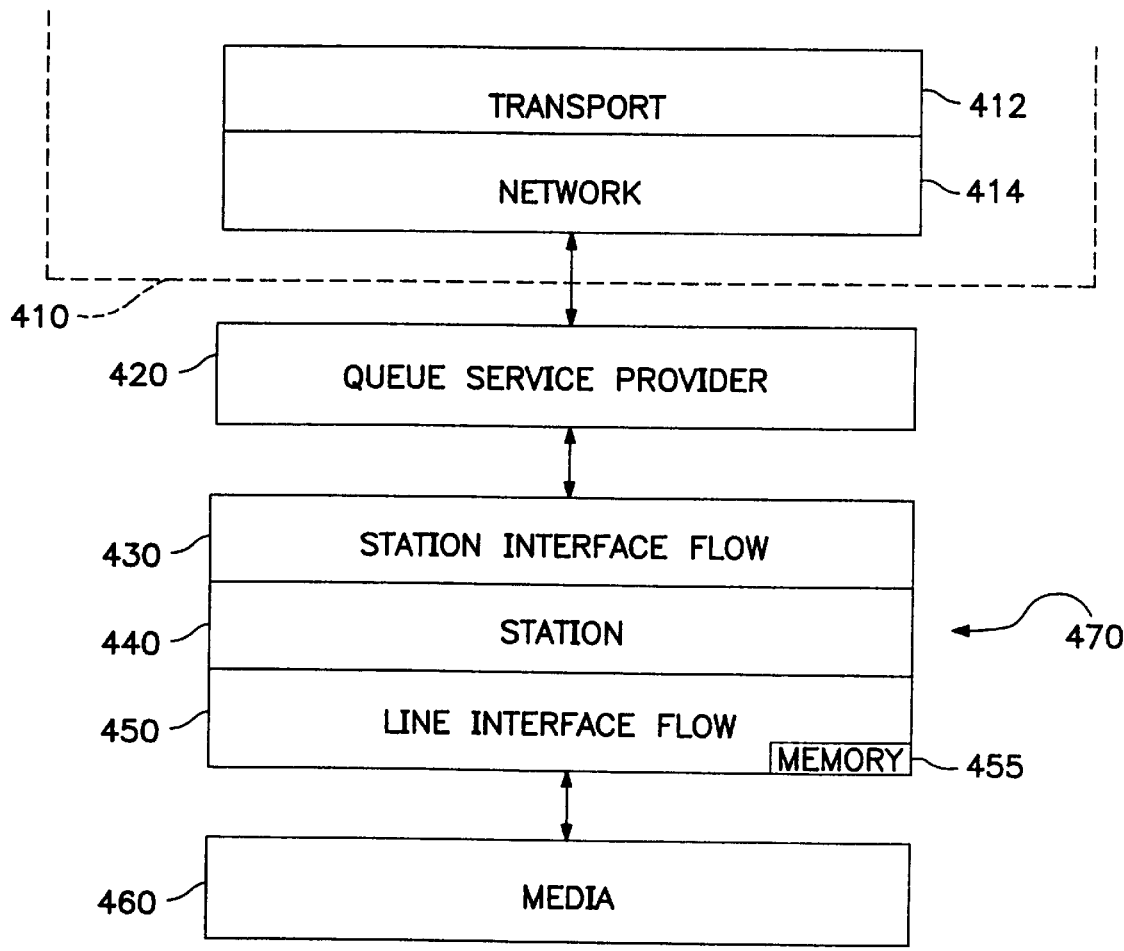
FIG. 4 is an exemplary implementation of an I/O channel used in conjunction with a computer processor and a media (for example, a transmission medium leading to a network) for which the present invention may be used.

As shown in FIG. 4, a Computer Processing System 410 transfers data to a particular destination (e.g., a network—not shown). Computer Processing System 410 may be, for example, an A-series computer system manufactured by Unisys Corporation, Blue Bell, Pa. Transport Level 412 provides computer applications with file transferability, for example. Network Level 414 manages the connection to the I/O channel, routes data, controls traffic, etc. Network Level 414 outputs data in the form of messages. Several messages are output in a group (i.e. a message set) and it is only the message set that desirably requires an Acknowledgment (ACK). The number of messages which may be output as a message set is related to a parameter which is referred to as window size. The greater the window size, the greater the number of messages which may be sent out together in a message set.

Returning to FIG. 4, Queue Service Provider 420 is included. I/O Board 470 is also included. I/O Board 470 implements the I/O channel which receives messages from Computer Processing System 410. I/O Board 470 may expect messages to be in a certain format which differs from the format of the messages output from Network Level 414. Queue Service Provider 420 provides the translation. For example, if I/O Board 470 expects messages to be in an Intel format, and if Computer Processing System 410 is an A-series computer processing system, Queue Service Provider 420 translates the A-series messages into an Intel format. I/O Board 470 constructs frames from the received message sets and outputs these frames in proper format onto the network.

Media 460 is shown. Media 460 may be, for example, the physical wire which is used for connecting I/O Board 470 to the network. Station 440 performs the desired formatting of messages. Station Interface Flow 430 interfaces Station 440 with the output of Queue Service Provider 420. Line Interface Flow 450 interfaces the output of Station 440 with the Actual Media 460.

In actual operation, Computer Processing System 410 outputs a plurality of messages to I/O Board 470 in the form of a message set. Each time I/O Board 470 receives a message set (irrespective of the total number of messages in the message set) from Computer Processing System 410, I/O Board 470 desirably transmits only one ACK signal to Computer Processing System 410 to acknowledge receipt of the message set. The total number of messages that are transmitted to I/O board 470 in a mesage set is determined by the window size of the I/O channel implemented by I/O board 470. Thus, if the window size is small, only a small number of messages are output in a message set. If the window size is large, a large number of messages are output in a message set. When the message set is converted to an appropriate format by Queue Service Provider 420, the message set is received by I/O Board 470. I/O Board 470 then transmits an ACK to Computer Processing System 410, through Queue Service Provider 420, to indicate that the message set has been successfully received. The message set is then made available to Media 460 for transmission to the network.

As previously described, once I/O Board 470 forms frames from the message set, these frames cannot be transmitted to the network until the network is ready to receive these frames. Accordingly, frames are placed within a queue inside Memory 455 until the network is ready to service them. Such a queue is typically a First-In-First-Out (FIFO) Queue. Frames of outgoing messages are placed into the rear of the queue. When the network is ready to service the frames, each frame is removed from the queue at the head of the queue. As long as the queue is not full, the queue can continue to receive frames of outgoing messages. Once the queue becomes full (i.e., the memory is full), I/O Board 470 cannot receive additional messages until the queue empties.

The inventors have determined that by regulating the window size, the message queue can be regulated so that it does not overflow. In other words, if Computer Processing System 410 determines that the window size is large, Computer Processing System 410 can transmit a mesage set consisting of a large number of messages to I/O Board 470 and expects only one ACK in return. Conversely, if Computer Processing System 410 determines that the window size is small, Computer Processing System 410 then transmits a message set consisting of a small number of messages towards I/O Board 470 and again expects only one ACK in return. Thus, if a large number of queue locations within I/O Board 470 are occupied with frames (containing messages) waiting to be serviced by the network, the window size within which message sets are sent to I/O Board 470 by Computer Processing System 410 is decreased so that the queue level within I/O Board 470 has an opportunity to recede.

The inventors have also found that two factors, memory utilization and queue size, may be used for a basis for generating the window size.

Memory utilization is a smooth percentage of memory that is used over a period of time. It is calculated and saved. For example, memory utilization may be derived by subtracting the product of total memory available and a constant from the value 100 to obtain the percentage of memory in use. The ability to determine available memory is well known in the art. Personal Computers, for example, readily provide a user with the amount of memory available upon being booted.

Queue depth is the number of messages residing in the message queue. The message queue holds frames which are waiting to be output to the network as soon as the network is ready to service those frames. Queue depth is obtained from a counter. When a frame is inserted into the message queue, the queue counter is incremented. When a frame is removed from the message queue, the queue counter is deleted. This is in accordance with standard queue processing.

In an exemplary embodiment of the present invention, multiple connections may interface to the network. Each connection may have its own queue of outbound messages waiting to be serviced/transmitted onto the network.

The inventors have also found that fuzzy logic may be used to determine window size using the memory utilization and the queue depth as input parameters.

Figure 5:
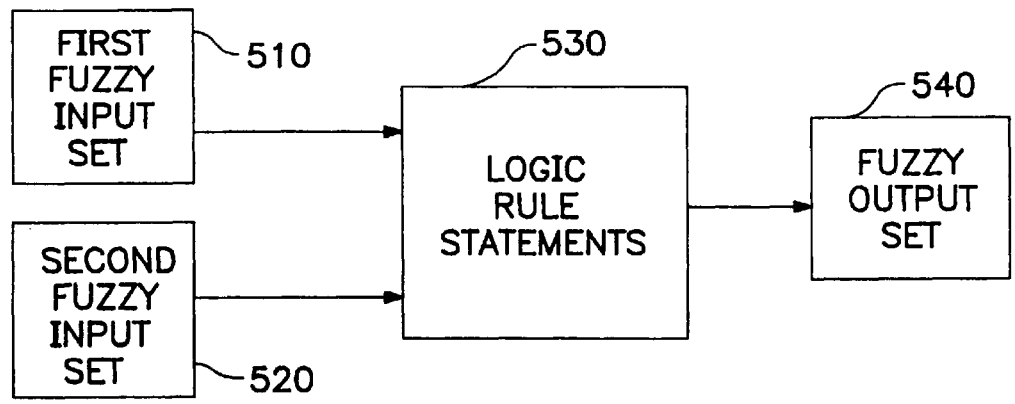
FIG. 5 is a block diagram which is useful for illustrating the generation of a fuzzy logic design.
Figure 6:
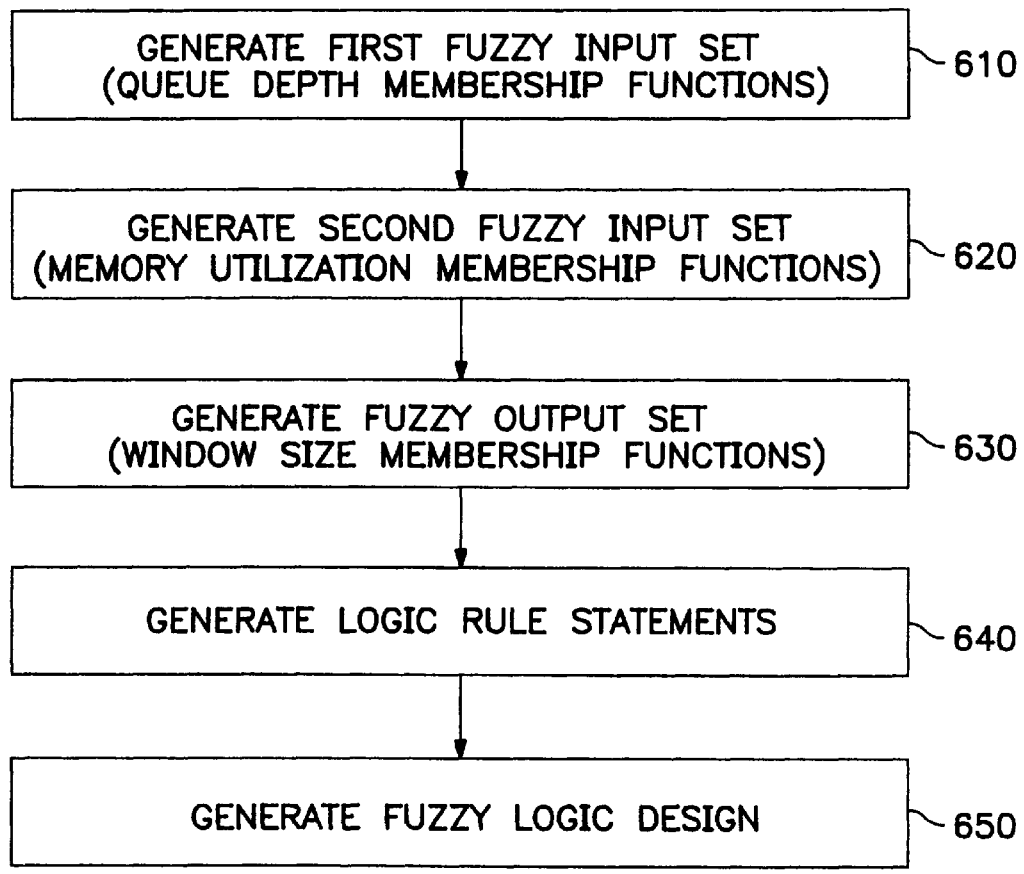
FIG. 6 is a flowchart diagram which is useful for illustrating the generation of a fuzzy logic design.

The use of fuzzy logic to determine, for example, window size is illustrated by the block diagram of FIG. 5 and the flowchart diagram of FIG. 6.

As set forth at step 610, a first fuzzy input set 510 is generated. This first fuzzy input set 510 includes the queue depth membership functions. The membership functions are defined by trapezoid sets. The trapezoid sets are used at the ends to create a ramp up/down effect on window size as the queue depth reaches its maximum or minimum. A triangular set is used in the middle to create a smooth transition of window size through the middle ranges. An exemplary description of the set membership for the input queue depth is as follows:

| QUEUE_DEPTH | 0 | 0 | 0 | 100 |
|---|---|---|---|---|
| MEMBER:EMPTY | 0 | 0 | 10 | 50 |
| MEMBER:HALF | 20 | 50 | 50 | 85 |
| MEMBER:FULL | 50 | 95 | 100 | 100 |

Figure 8:
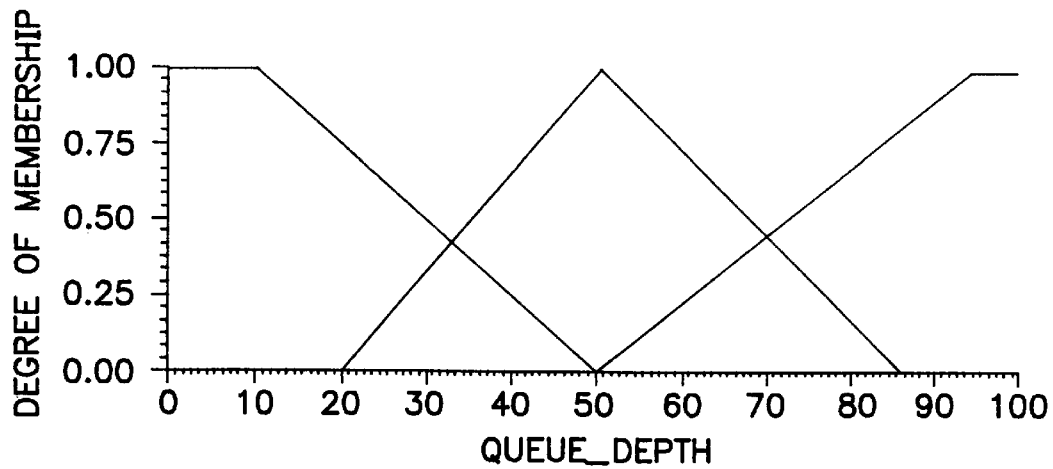
FIG. 8 is a graph which illustrates set memberships for the input queue depth values in accordance with an exemplary embodiment of the present invention.

An exemplary graph of the set memberships for the input queue depth is illustrated in FIG. 8.

At step 620, a second fuzzy input set 520 is generated. This second fuzzy input set 520 includes the memory utilization membership functions. Again, trapezoid sets are used at the ends to create a ramp up/down effect on window size as the memory utilization reaches its maximum or minimum value. The triangular set is used in the middle to create a smooth transition on window size through the middle ranges. An exemplary description of the set memberships for the input memory utilization is as follows:

| MEMORY_UTIL | 0 | 0 | 0 | 100 |
|---|---|---|---|---|
| MEMBER:EMPTY | 0 | 0 | 10 | 50 |
| MEMBER:HALF | 20 | 50 | 50 | 85 |
| MEMBER:FULL | 50 | 95 | 100 | 100 |

Figure 9:
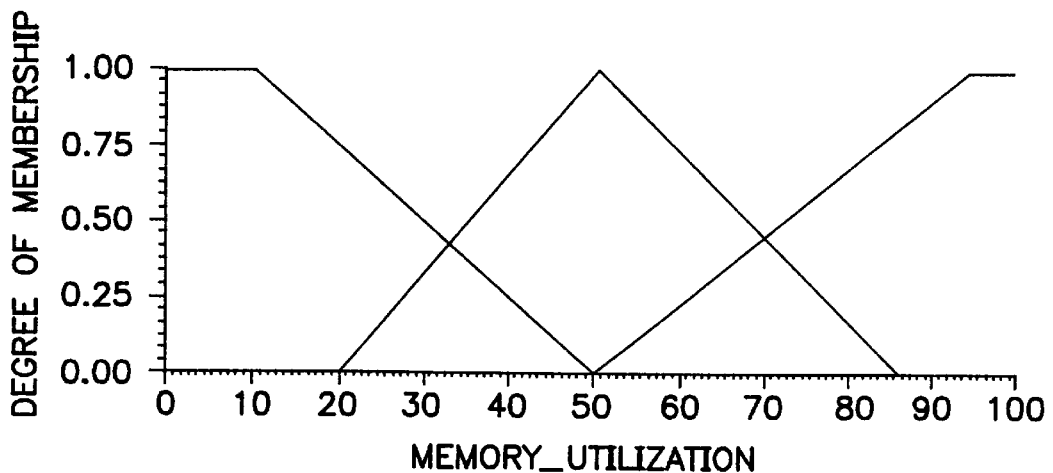
FIG. 9 is a graph which illustrates set memberships for the input of memory utilization values in accordance with an exemplary embodiment of the present invention.

An exemplary graph which illustrates set memberships for the input memory utilization is shown in FIG. 9.

Next, at step 630, a fuzzy output set 540 is generated. This fuzzy output set 540 includes window size membership functions. The values for this membership function were chosen to create a smooth transition between window sizes. An exemplary description of these membership functions is as follows:

| WINDOW_SIZE | 0 | 50 |
|---|---|---|
| MEMBER:X_SMALL | 1 | |
| MEMBER:SMALL | 12 | |
| MEMBER:HALF | 25 | |
| MEMBER:LARGE | 37 | |
| MEMBER:X_LARGE | 50 | |

Figure 10:
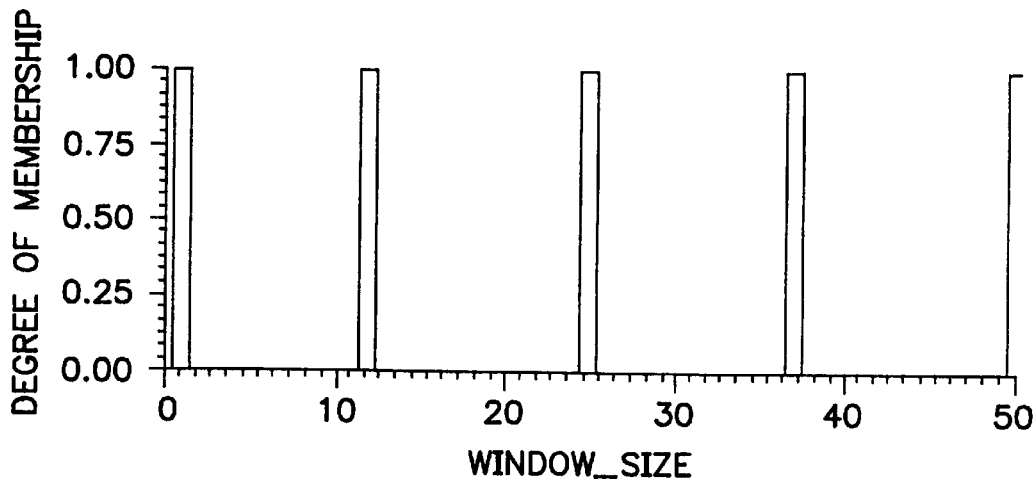
FIG. 10 is a graph of the set memberships for the output of window size in accordance with an exemplary embodiment of the present invention.

An exemplary graph which illustrates the membership functions for this fuzzy output set is illustrated in FIG. 10. The output sets are singletons. Singletons are used because they provide a fast method of evaluating crisp output values while minimizing required computation.

Next, at step 640, logic rule statements are generated. In an exemplary embodiment of the present invention, nine evaluation rules are used. The nine rules cover all combinations of the inputs to the two fuzzy input sets. The outputs of the rules were chosen by experience, prototyping and simulation. These rules are the basis for defining crisp outputs.

RULE1:
    if QUEUE_DEPTH is EMPTY and
    MEMORY_UTILIZATION is EMPTY then
    WINDOW_SIZE is XTRA_LARGE
RULE2:
    if QUEUE_DEPTH is EMPTY and
    MEMORY_UTILIZATION is HALF then
    WINDOW_SIZE is HALF
RULE3:
    if QUEUE_DEPTH is EMPTY and
    MEMORY_UTILIZATION is FULL then
    WINDOW_SIZE is XTRA_SMALL -continued

```
RULE4:
    if QUEUE_DEPTH is HALF and
    MEMORY_UTILIZATION is EMPTY then
    WINDOW_SIZE is XTRA_LARGE
RULE5:
    if QUEUE_DEPTH is HALF and
    MEMORY_UTILIZATION is HALF then
    WINDOW_SIZE is HALF
RULE6:
    if QUEUE_DEPTH is FULL and
    MEMORY_UTILIZATION is FULL then
    WINDOW_SIZE is XTRA_SMALL
RULE7:
    if QUEUE_DEPTH is FULL and
    MEMORY_UTILIZATION is EMPTY then
    WINDOW_SIZE is LARGE
RULE8:
    if QUEUE_DEPTH is FULL and
    MEMORY_UTILIZATION is FULL then
    WINDOW_SIZE is HALF
RULE9:
    if QUEUE_DEPTH is FULL and
    MEMORY_UTILIZATION is FULL then
    WINDOW_SIZE is XTRA_SMALL
```

Having generated first fuzzy input set 510, second fuzzy input set 520, logic rules statements 530, and fuzzy output set 540, the source and object code for the fuzzy logic design may then be generated. The fuzzy sets and logic rule statements are input and the source and object code for the fuzzy logic design may be generated, for example using the Fuzzy Logic Designer Tool Kit which is available from Byte Dynamics, Inc.

Once the source and object code have been generated, and the object code is installed in Computer Processing System 410, the window size may be calculated. This is illustrated by FIG. 7.

Figure 7:
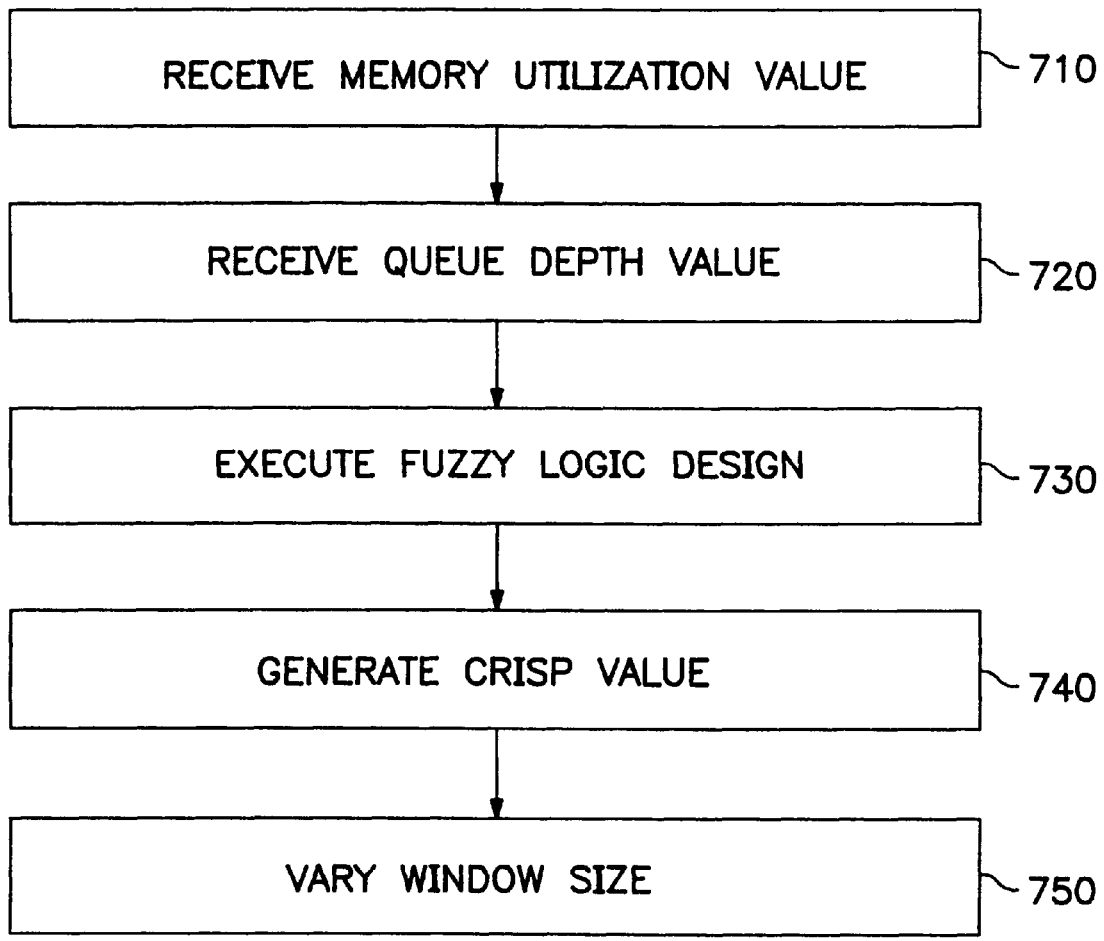
FIG. 7 is a flowchart diagram which is useful for explaining the operation of an exemplary embodiment of the present invention.

As shown in FIG. 7, at steps 710 and 720, a memory utilization value and a queue depth value are received by Computer Processor System 410. These values may be received together. The memory utilization value and queue depth value are calculated by I/O board 470 and are transmitted to Computer Processing System 410 each time I/O board 470 transmits an ACK signal to Computer Processing System 410 to acknowledge receipt of a message set. For this purpose, Computer Processing System 410 may transmit a memory utilization value Enable signal and a queue depth value Enable signal to I/O board 470 each time a message set is transmitted to I/O board 470 so that I/O board 470 transmits a queue depth value and a memory utilization value to Computer Processing System 410 each time an ACK signal is transmitted.

At step 730, the software corresponding to the fuzzy logic design is executed and at step 740 a crisp set (with corresponding crisp value) is identified.

At step 750, the window size is varied. Thus, based on this window size, an appropriate limit is placed on the total number of messages included in a message set transmitted from Computer Processing System 410 to I/O board 470.

The message set is transmitted by Computer Processing System 410 with number of messages dictated by window size. I/O Board 470 responds with an ACK signal, another memory utilization value and another queue depth value, and the entire process repeats from step 710.

The code which was generated by the inventors by using the fuzzy logic design kit may be found in attached Appendix A.

The test results from the code found in Appendix A have been included in Appendix B. Queue depth is adjusted in increments of five and memory utilization is adjusted in increments of two. It can be seen that the window size output has a smooth and gradual transition as both inputs increase and decrease. Following the window size value is the processor time overhead for each window size computation, averaged over 1000 computations.

Figure 11:
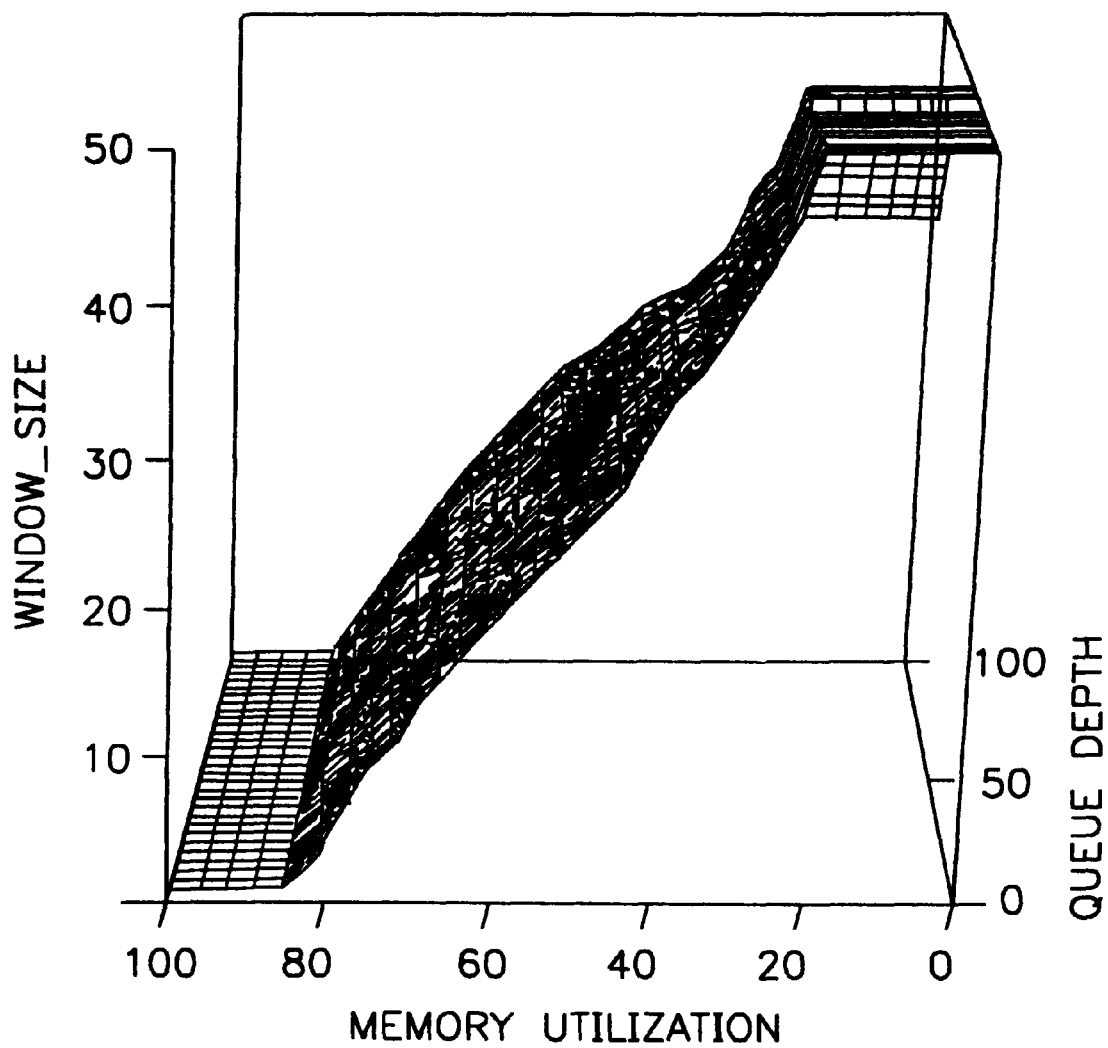
FIG. 11 is a graph which represents in 3-D the relationship between window size, memory utilization and queue depth which is exemplary of the results obtained using the present invention.
Figure 12:
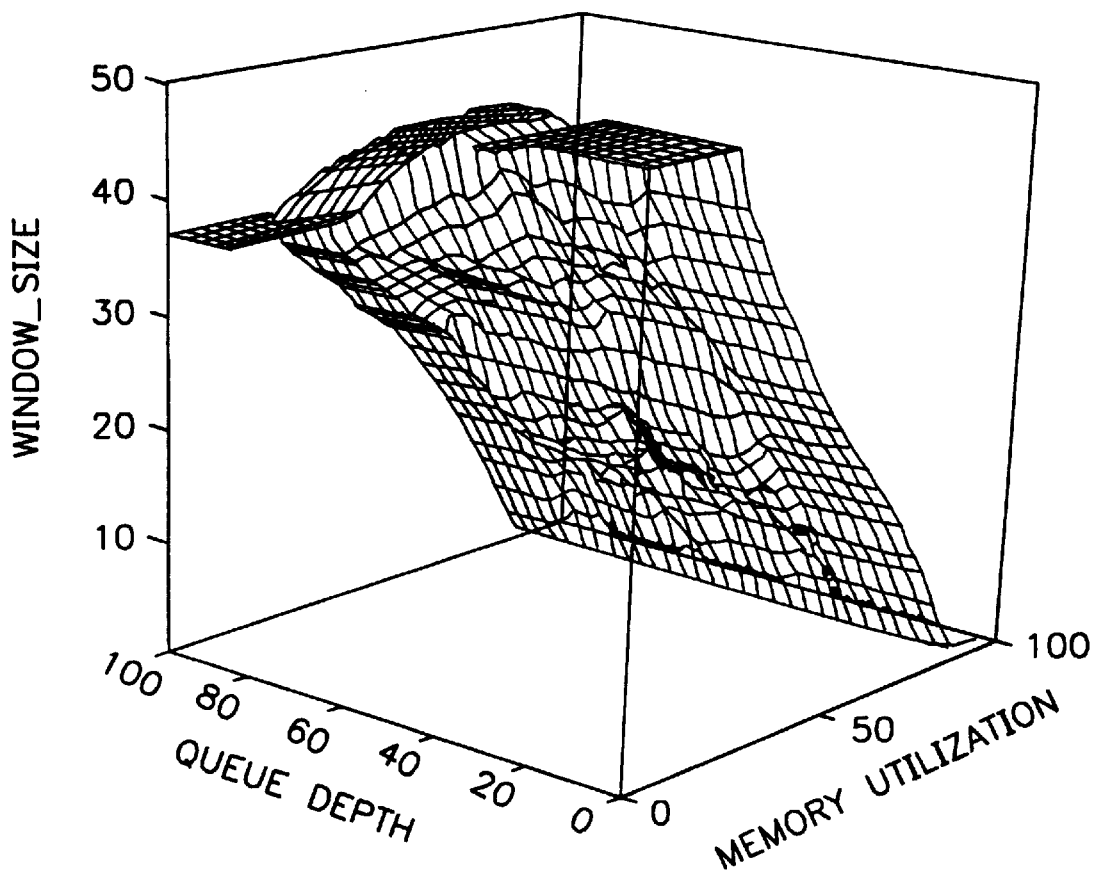
FIG. 12 is a further three dimensional representation of a graph which illustrates the relationship between window size, memory utilization, and queue depth which is obtained using the present invention.

Several graphs were generated with varying inputs using the simulation mode of the Fuzzy Logic Design Tool Kit. FIGS. 11 and 12 are three dimensional representations showing window size decreasing as memory utilization and queue depth increase. The graph included in FIG. 11 shows that window size decreases as memory utilization increases, along with an increase in queue depth. The graph also shows that memory utilization has a greater effect on window size than does queue depth.

Figure 13:
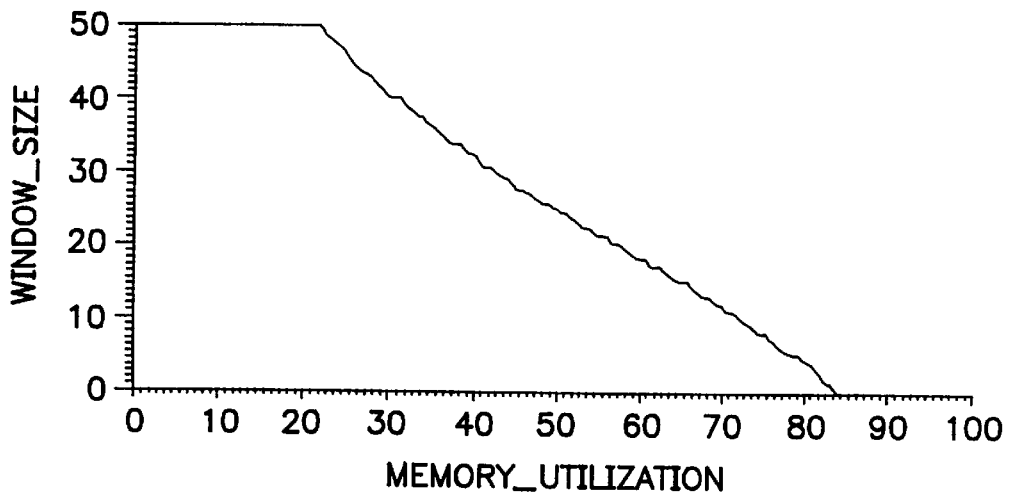
FIG. 13 is a graph which illustrates the effect of memory utilization on window size which is illustrative of the results obtained by the present invention.
Figure 14:
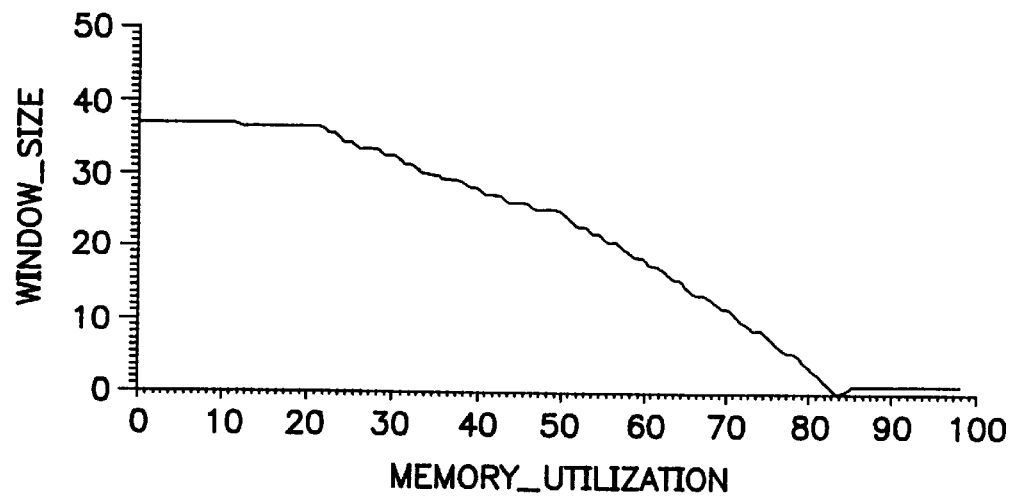
FIG. 14 is a further graph which illustrates the effect of memory utilization on window size which is illustrative of the results obtained by the present invention.
Figure 15:
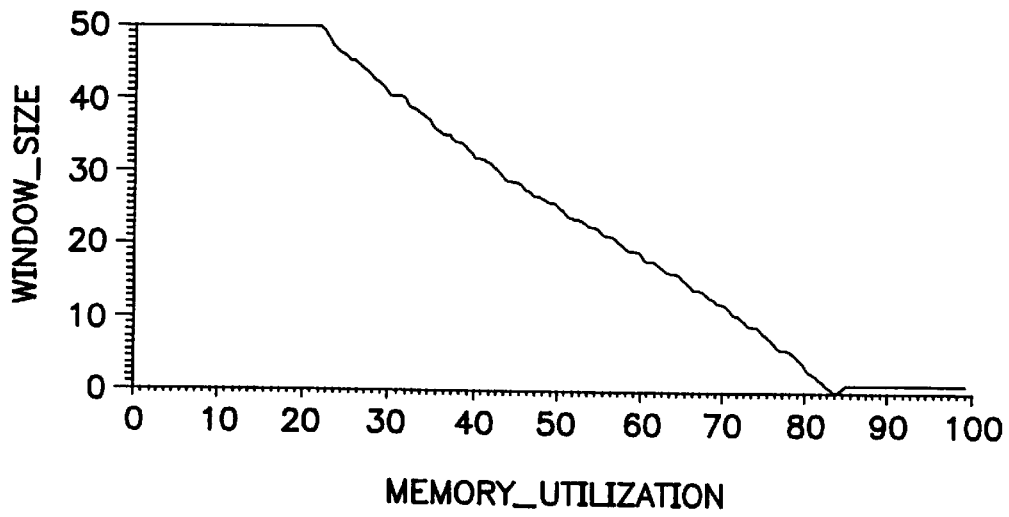
FIG. 15 is a further graph which illustrates the effect of memory utilization on window size which is illustrative of the results obtained by the present invention.

The graph shown in FIG. 12 illustrates that window size decreases as queue depth increases, along with an increase in memory utilization. Furthermore, this graph shows that queue depth does not effect window size as significantly as memory utilization. FIGS. 13, 14 and 15 show the effects on window size at queue depths of maximum, one-half and minimum, respectively as memory utilization increases.

Figure 16:
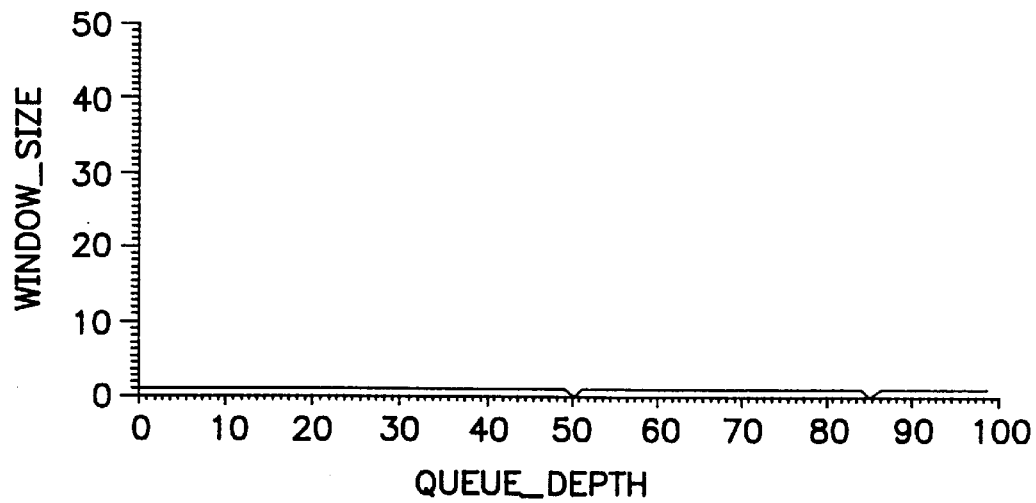
FIG. 16 is a graph which illustrates the effect of queue depth on window size which is illustrative of the results obtained by the present invention.
Figure 17:
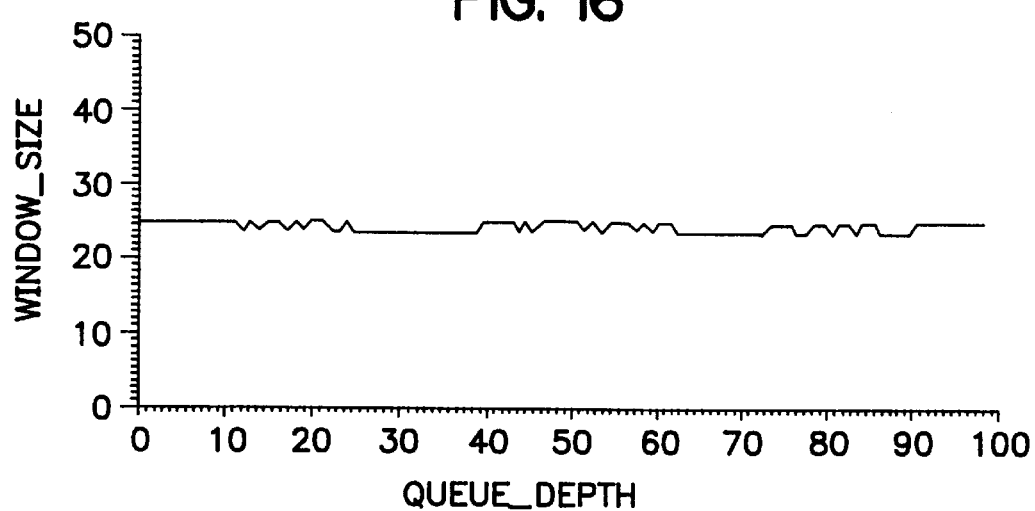
FIG. 17 is a graph which illustrates the effect of queue depth on window size which is illustrative of the results obtained by the present invention.
Figure 18:
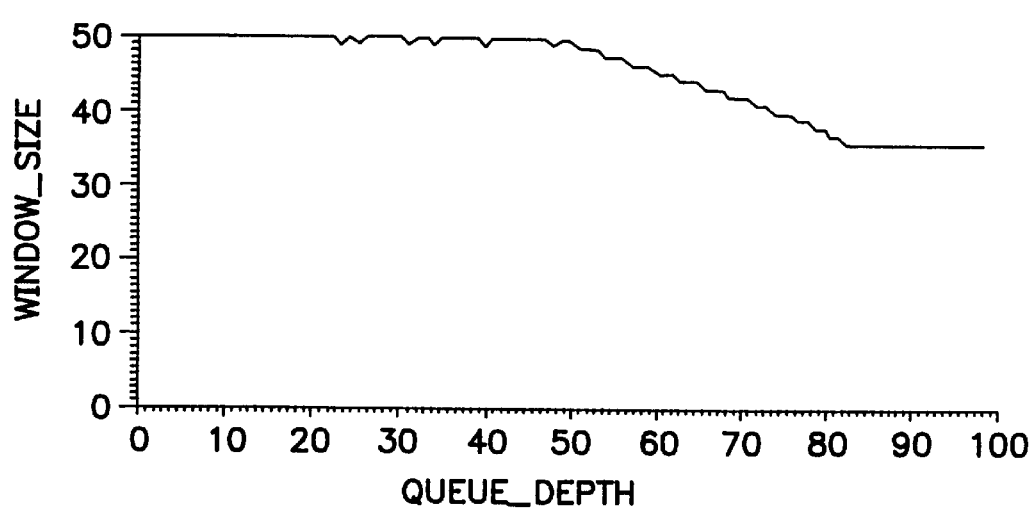
FIG. 18 is a graph which illustrates the effect of queue depth on window size which is illustrative of the results obtained by the present invention.

The charts shown in FIGS. 16, 17 and 18 illustrate the effects on window size at memory utilizations of maximum, one-half and minimum, respectively as queue depth increases.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

APPENDIX A

```
%$set list map
begin
    file
        Rem(kind=remote, units=characters, maxrecsize=80, fileuse=out)
        ;
    ebcdic array
        RemBuff[0:79]
        ;
    pointer
        RemBuffP
        ;
    define
        comma = ,#
        ,speak(txt) = begin
            replace RemBuffP:=RemBuff by " " for 80;
            replace RemBuffP:RemBuffP by txt;
            write(Rem,offset(RemBuffP),RemBuff);
            end#
        ;
% Number of Windows values
constant
    WSmallest = 1
    ,WSmall = 12
    ,WMedium = 25
    ,WLarge = 37
    ,WLargest = 50
    ;
% Range values
constant
    Empty = 0
    ,EmptyPlus = 10
    ,HalfMinus = 20
    ,Half = 50
    ,HalfPlus = 85
```

APPENDIX A

```
        ,FullMinus = 95
        ,Full = 100
        ,Qlimit = 250
        ;
    real
        Time1
        ,Time2
        ,TimeDiff
        ,Looper
        ,QDepth
        ,Mem
        ,Windows
        ;
%$set code
real procedure FuzzyWuzzy(Mem, Que);
value Mem, Que;
real Mem, Que;
begin
    real
        RsltQueEmpty
        ,RsltQueHalf
        ,RsltQueFull
        ,RsltMemEmpty
        ,RsltMemHalf
        ,RsltMemFull
        ,Rslt
        ,RsltWindows
        ,SumWindows
        ;
% Que is queue depth. We have to change this from a 0-250 range to a
% 0-100 range. Mem is utilization percentage, i.e. in-use as
% opposed to available (0 = empty, 100 = full).
% Assert limits
    if Que < Empty then
        Que:=Empty
    else
    if Que > QLimit then
        Que:=QLimit;
    Que:=Que/(QLimit/100):
    if Mem < Empty then
        Mem:=Empty
    else
    if Mem > Full then
        Mem:=Full;
% Queue Depth Analysis
    if Que <= EmptyPlus then
        RsltQueEmpty:=1
    else
    if Que <= (Half - 1)then
        RsltQueEmpty:= 1 - ((Que - EmptyPlus) * 0.025641);
    if Que = Half then
        RsltQueHalf:= 1
    else
    if Que >= HalfMinus then
        if Que <= Half then
            RsltQueHalf:= (Que - HalfMinus) * 0.028571
        else
        if Que <= HalfPlus then
            RsltQueHalf:= 1 - ((Que - Half) * 0.028571;
    if Que >= FullMinus then
        RsltQueFull:= 1
    else
    if Que >=(Half + 1) then
        RsltQueFull:= (Que - (Half + 1)) * 0.025461;
% Memory Analysis
    if Mem <= EmptyPlus then
        RsltMemEmpty:= 1
    else
    if Mem <= (Half - 1) then
        RsltMemEmpty:= 1 - ((Mem - EmptyPlus) * 0.025641);
    if Mem = Half then
        RsltMemHalf:= 1
    else
    if Mem <= Half then
        RsltMemHalf:= (Mem - HalfMinus) * 0.028571
    else
    if Mem <= HalfPlus then
        RsltMemHalf:= 1 - ((Mem - Half) * 0.028571);
    if Mem >= FullMinus then
        RsltMemFull:= 1
    else
    if Mem >= (Half + 1) then
        RsltMemFull:= (Mem - (Half + 1)) * 0.025641;
% Rule Evaluation
% Rule 1: if Queue is Empty and Memory is Empty then
%           Windows is Largest
%
        Rslt:= min(RsltQueEmpty, 1);
        Rslt:= min(RsltMemEmpty, Rslt);
        RsltWindows:= * + (Rslt*WLargest);
        SumWindows:= * + Rslt;
% Rule 2: if Queue is Empty and Memory is Half then
%           Windows is Medium
%
        Rslt:= min(RsltQueEmpty, 1);
        Rslt:= min(RsltMemHalf, Rslt);
        RsltWindows:= * + (Rslt*WMedium);
        SumWindows:= * + Rslt;
% Rule 3: if Queue is Empty and Memory is Full then
%           Windows is Smallest
%
        Rslt:= min(RsltQueEmpty, 1);
        Rslt:= min(RsltMemFull, Rslt);
        RsltWindows:= * + (Rslt*WSmallest);
        SumWindows:= * + Rslt;
% Rule 4: if Queue is Half and Memory is Empty then
%           Windows is Largest
%
        Rslt:= min(RsltQueHalf, 1);
        Rslt:= min(RsltMemEmpty, Rslt);
        RsltWindows:= * + (Rslt*WLargest);
        SumWindows:= * + Rslt;
% Rule 5: if Queue is Half and Memory is Half then
%           Windows is Medium
%
        Rslt:= min(RsltQueHalf, 1);
        Rslt:= min(RsltMemHalf, Rslt);
        RsltWindows:= * + (Rslt*WMedium);
        SumWindows:= * + Rslt;
% Rule 6: if Queue is Half and Memory is Full then
%           Windows is Smallest
%
        Rslt:= min(RsltQueHalf, 1);
        Rslt:= min(RsltMemFull, Rslt);
        RsltWindows:= * + (Rslt*WSmallest);
        SumWindows:= * + Rslt;
% Rule 7: if Queue is Full and Memory is Empty then
%           Windows is Large
%
        Rslt:= min(RsltQueFull, 1);
        Rslt:= min(RsltMemEmpty, Rslt);
        RsltWindows:= * + (Rslt*WLarge);
        SumWindows:= * + Rslt;
% Rule 8: if Queue is Full and Memory is Half then
%           Windows is Medium
%
        Rslt:= min(RsltQueFull, 1);
        Rslt:= min(RsltMemHalf, Rslt);
        RsltWindows:= * + (Rslt*WMedium);
        SumWindows:= * + Rslt;
% Rule 9: if Queue is Full and Memory is Full then
%           Windows is Smallest
%
        Rslt:= min(RsltQueFull, 1);
        Rslt:= min(RsltMemFull, Rslt);
        RsltWindows:= * + (Rslt*WSmallest);
        SumWindows:= * + Rslt;
% Return # Windows
%
    if SumWindows > 0 then
        FuzzyWuzzy:= RsltWindows div SumWindows;
end of FuzzyWuzzy;
%$pop code list
Mem:= 5;
QDepth:= 0:
thru 50 do
```

APPENDIX A

```
begin
    Time1:=time(12);
    for Looper:= 1 step 1 until 100 do
        begin
            Windows:= FuzzyWuzzy(Mem, QDepth);
            Windows:= FuzzyWuzzy(Mem, QDepth);
            Windows:= FuzzyWuzzy(Mem, QDepth);
            Windows:= FuzzyWuzzy(Mem, QDepth);
            Windows:= FuzzyWuzzy(Mem, QDepth);
            Windows:= FuzzyWuzzy(Mem, QDepth);
            Windows:= FuzzyWuzzy(Mem, QDepth);
            Windows:= FuzzyWuzzy(Mem, QDepth);
            Windows:= FuzzyWuzzy(Mem, QDepth);
            Windows:= FuzzyWuzzy(Mem, QDepth);
        end;
    time2:= time(12);
    speak (" Q depth:" comma Qdepth for 3 numeric comma
        " Mem util:" comma
        (if Mem > 100 then 100 else Mem) for 3 numeric comma
        " Windows:" comma Windows for 3 numeric comma
        " usec:" comma(((time2−time1) * 2.4)/1000) for
        3 numeric);
    QDepth:= * + 5;
    Mem:= * + 2;
end:
thru 50 do
    begin
        Time1:= time(12);
        for Looper:= 1 step 1 until 100 do
            begin
                Windows:= FuzzyWuzzy(Mem, QDepth);
                Windows:= FuzzyWuzzy(Mem, QDepth);
                Windows:= FuzzyWuzzy(Mem, QDepth);
                Windows:= FuzzyWuzzy(Mem, QDepth);
                Windows:= FuzzyWuzzy(Mem, QDepth);
                Windows:= FuzzyWuzzy(Mem, QDepth);
                Windows:= FuzzyWuzzy(Mem, QDepth);
                Windows:= FuzzyWuzzy(Mem, QDepth);
                Windows:= FuzzyWuzzy(Mem, QDepth);
                Windows:= FuzzyWuzzy(Mem, QDepth);
            end;
        time2:= time(12);
        speak (" Q depth:" comma Qdepth for 3 numeric comma
            " Mem util:" comma
            (if Mem > 100 then 100 else Mem) for 3 numeric comma
            " Windows:" comma Windows for 3 numeric comma
            " usec:" comma (((time2−time1) * 2.4)/1000) for
            3 numeric);
        QDepth:= * − 5;
        Mem:= * − 2;
    end;
end.
```

APPENDIX B

| INPUT | INPUT | OUTPUT | TIME |
|---|---|---|---|
| Q depth: 0 | Mem util: 5 | Windows: 50 | usec: 26. |
| Q depth: 5 | Mem util: 7 | Windows: 50 | usec: 27. |
| Q depth: 10 | Mem util: 9 | Windows: 50 | usec: 26. |
| Q depth: 15 | Mem util: 11 | Windows: 49 | usec: 27. |
| Q depth: 20 | Mem util: 13 | Windows: 50 | usec: 27. |
| Q depth: 25 | Mem util: 15 | Windows: 49 | usec: 27. |
| Q depth: 30 | Mem util: 17 | Windows: 50 | usec: 30. |
| Q depth: 35 | Mem util: 19 | Windows: 49 | usec: 30. |
| Q depth: 40 | Mem util: 21 | Windows: 49 | usec: 31. |
| Q depth: 45 | Mem util: 23 | Windows: 47 | usec: 31. |
| Q depth: 50 | Mem util: 25 | Windows: 45 | usec: 32. |
| Q depth: 55 | Mem util: 27 | Windows: 42 | usec: 32. |
| Q depth: 60 | Mem util: 29 | Windows: 40 | usec: 32. |
| Q depth: 65 | Mem util: 31 | Windows: 39 | usec: 33. |
| Q depth: 70 | Mem util: 33 | Windows: 37 | usec: 33. |
| Q depth: 75 | Mem util: 35 | Windows: 36 | usec: 33. |
| Q depth: 80 | Mem util: 37 | Windows: 36 | usec: 32. |
| Q depth: 85 | Mem util: 39 | Windows: 34 | usec: 32. |
| Q depth: 90 | Mem util: 41 | Windows: 33 | usec: 32. |
| Q depth: 95 | Mem util: 43 | Windows: 31 | usec: 32. |
| Q depth: 100 | Mem util: 45 | Windows: 30 | usec: 32. |
| Q depth: 105 | Mem util: 47 | Windows: 27 | usec: 33. |
| Q depth: 110 | Mem util: 49 | Windows: 25 | usec: 32. |
| Q depth: 115 | Mem util: 51 | Windows: 24 | usec: 32. |
| Q depth: 120 | Mem util: 53 | Windows: 22 | usec: 32. |
| Q depth: 125 | Mem util: 55 | Windows: 22 | usec: 28. |
| Q depth: 130 | Mem util: 57 | Windows: 20 | usec: 32. |
| Q depth: 135 | Mem util: 59 | Windows: 18 | usec: 32. |
| Q depth: 140 | Mem util: 61 | Windows: 17 | usec: 32. |
| Q depth: 145 | Mem util: 63 | Windows: 15 | usec: 32. |
| Q depth: 150 | Mem util: 65 | Windows: 14 | usec: 32. |
| Q depth: 155 | Mem util: 67 | Windows: 13 | usec: 32. |
| Q depth: 160 | Mem util: 69 | Windows: 12 | usec: 32. |
| Q depth: 165 | Mem util: 71 | Windows: 12 | usec: 32. |
| Q depth: 170 | Mem util: 73 | Windows: 11 | usec: 32. |
| Q depth: 175 | Mem util: 75 | Windows: 10 | usec: 32. |
| Q depth: 180 | Mem util: 77 | Windows: 9 | usec: 32. |
| Q depth: 185 | Mem util: 79 | Windows: 7 | usec: 32. |
| Q depth: 190 | Mem util: 81 | Windows: 5 | usec: 32. |
| Q depth: 195 | Mem util: 83 | Windows: 3 | usec: 32. |
| Q depth: 200 | Mem util: 85 | Windows: 1 | usec: 32. |
| Q depth: 205 | Mem util: 87 | Windows: 1 | usec: 32. |
| Q depth: 210 | Mem util: 89 | Windows: 1 | usec: 32. |
| Q depth: 215 | Mem util: 91 | Windows: 1 | usec: 30. |
| Q depth: 220 | Mem util: 93 | Windows: 1 | usec: 30. |
| Q depth: 225 | Mem util: 95 | Windows: 1 | usec: 29. |
| Q depth: 230 | Mem util: 97 | Windows: 1 | usec: 29. |
| Q depth: 235 | Mem util: 99 | Windows: 1 | usec: 29. |
| Q depth: 240 | Mem util: 100 | Windows: 1 | usec: 28. |
| Q depth: 245 | Mem util: 100 | Windows: 1 | usec: 28. |
| Q depth: 250 | Mem util: 100 | Windows: 1 | usec: 28. |
| Q depth: 245 | Mem util: 100 | Windows: 1 | usec: 28. |
| Q depth: 240 | Mem util: 100 | Windows: 1 | usec: 28. |
| Q depth: 235 | Mem util: 99 | Windows: 1 | usec: 29. |
| Q depth: 230 | Mem util: 97 | Windows: 1 | usec: 29. |
| Q depth: 225 | Mem util: 95 | Windows: 1 | usec: 29. |
| Q depth: 220 | Mem util: 93 | Windows: 1 | usec: 30. |
| Q depth: 215 | Mem util: 91 | Windows: 1 | usec: 30. |
| Q depth: 210 | Mem util: 89 | Windows: 1 | usec: 32. |
| Q depth: 205 | Mem util: 87 | Windows: 1 | usec: 32. |
| Q depth: 200 | Mem util: 85 | Windows: 1 | usec: 32. |
| Q depth: 195 | Mem util: 83 | Windows: 3 | usec: 32. |
| Q depth: 190 | Mem util: 81 | Windows: 5 | usec: 32. |
| Q depth: 185 | Mem util: 79 | Windows: 7 | usec: 32. |
| Q depth: 180 | Mem util: 77 | Windows: 9 | usec: 32. |
| Q depth: 175 | Mem util: 75 | Windows: 10 | usec: 32. |
| Q depth: 170 | Mem util: 73 | Windows: 11 | usec: 32. |
| Q depth: 165 | Mem util: 71 | Windows: 12 | usec: 32. |
| Q depth: 160 | Mem util: 69 | Windows: 12 | usec: 32. |
| Q depth: 155 | Mem util: 67 | Windows: 13 | usec: 32. |
| Q depth: 150 | Mem util: 65 | Windows: 14 | usec: 32. |
| Q depth: 145 | Mem util: 63 | Windows: 15 | usec: 32. |
| Q depth: 140 | Mem util: 61 | Windows: 17 | usec: 32. |
| Q depth: 135 | Mem util: 59 | Windows: 18 | usec: 32. |
| Q depth: 130 | Mem util: 57 | Windows: 20 | usec: 32. |
| Q depth: 125 | Mem util: 55 | Windows: 22 | usec: 28. |
| Q depth: 120 | Mem util: 53 | Windows: 22 | usec: 32. |
| Q depth: 115 | Mem util: 51 | Windows: 24 | usec: 32. |
| Q depth: 110 | Mem util: 49 | Windows: 25 | usec: 32. |
| Q depth: 105 | Mem util: 47 | Windows: 27 | usec: 33. |
| Q depth: 100 | Mem util: 45 | Windows: 30 | usec: 32. |
| Q depth: 95 | Mem util: 43 | Windows: 31 | usec: 32. |
| Q depth: 90 | Mem util: 41 | Windows: 33 | usec: 32. |
| Q depth: 85 | Mem util: 39 | Windows: 34 | usec: 32. |
| Q depth: 80 | Mem util: 37 | Windows: 36 | usec: 32. |
| Q depth: 75 | Mem util: 35 | Windows: 36 | usec: 32. |
| Q depth: 70 | Mem util: 33 | Windows: 37 | usec: 32. |
| Q depth: 65 | Mem util: 31 | Windows: 39 | usec: 32. |
| Q depth: 60 | Mem util: 29 | Windows: 40 | usec: 32. |
| Q depth: 55 | Mem util: 27 | Windows: 42 | usec: 32. |
| Q depth: 50 | Mem util: 25 | Windows: 45 | usec: 32. |
| Q depth: 45 | Mem util: 23 | Windows: 47 | usec: 31. |
| Q depth: 40 | Mem util: 21 | Windows: 49 | usec: 30. |
| Q depth: 35 | Mem util: 19 | Windows: 49 | usec: 30. |

-continued

APPENDIX B

| INPUT | INPUT | OUTPUT | TIME |
|---|---|---|---|
| Q depth: 30 | Mem util: 17 | Windows: 50 | usec: 30. |
| Q depth: 25 | Mem util: 15 | Windows: 49 | usec: 27. |
| Q depth: 20 | Mem util: 13 | Windows: 50 | usec: 27. |
| Q depth: 15 | Mem util: 11 | Windows: 49 | usec: 27. |
| Q depth: 10 | Mem util: 9 | Windows: 50 | usec: 26. |
| Q depth: 5 | Mem util: 7 | Windows: 50 | usec: 26. |

What is claimed:

1. Apparatus for characterizing window size of a data channel, comprising:

means for receiving an indication of memory utilization associated with said data channel;

means for receiving a queue depth value indicative of queue depth of messages located within a message queue maintained by said data channel; and fuzzy logic generating means for using said memory utilization indication and said queue depth value to generate a crisp value corresponding to said window size.

2. Apparatus as set forth in claim 1 which further includes:

a first fuzzy logic input set including a first plurality of membership functions corresponding to queue depth of a message queue associated with said data channel;

a second fuzzy logic input set including a second plurality of membership functions corresponding to memory utilization of a memory associated with said data channel;

a fuzzy logic output set including a third plurality of membership functions corresponding to window size; and a plurality of fuzzy logic rule statements defining the relationships between a) said first fuzzy logic input set and said second fuzzy logic input set, and b) said fuzzy logic output set.

3. Apparatus as set forth in claim 1 which further includes:

data channel means for generating an indication of said memory utilization associated with said data channel.

4. Apparatus as set forth in claim 3 which further includes:

processor means for transmitting messages to said data channel and wherein at least one of said queue depth value and said memory utilization value is transmitted from said data channel to said processor to acknowledge each message transmission.

5. Apparatus as set forth in claim 1 which further includes means for incrementing said queue depth value each time one of said messages is added to said queue and decremented the value each time one of said messages is removed from said queue.

6. Apparatus as set forth in claim 1 wherein said memory utilization indication value comprises a smoothed percentage of memory used over a period of time.

7. Apparatus as set forth in claim 6 which further includes:

a message queue for maintaining a queue of messages which are waiting to be serviced by a network.

8. Apparatus as set forth in claim 1 wherein said fuzzy logic generating means comprises:

means for generating a first fuzzy input set including a first plurality of membership functions corresponding to queue depth;

means for generating a second fuzzy input set including a second plurality of membership functions corresponding to memory utilization;

means for generating a fuzzy output set including a third plurality of membership functions corresponding to window size; and means for generating a plurality of logic rule statements defining relationships between a) said first fuzzy input set and said second fuzzy input set and b) said fuzzy output set.

9. Apparatus as set forth in claim 1 wherein said crisp value comprises one of a plurality of output sets, each output set corresponding to a respectively different window size.

10. Apparatus for characterizing window size as set forth in claim 1 which further includes:

means for receiving a plurality of data values representative of the operation of said data channel; and means for processing said plurality of data values using fuzzy logic design to generate said crisp value corresponding to said window size.

11. Apparatus as set forth in claim 1 which further includes:

means for regulating flow control between a processor and a data channel;

said means for executing a fuzzy logic design to generate a crisp value corresponding to window size of said data channel further including;

means for varying flow control between said processor and said data channel depending upon said generated crisp value.

12. Apparatus for regulating flow control between a processor and a data channel, comprising:

means for receiving an indication of memory utilization associated with said data channel;

means for receiving a queue depth value indicative of queue depth of messages located within a message queue maintained by said data channel; and calculating means for using said memory utilization indication and said queue depth value to generate a window size value corresponding to said window size.

13. Apparatus as set forth in claim 12 which further includes:

means for generating a crisp value corresponding to window size of said data channel using a fuzzy logic design; and means for varying flow control between said processor and said data channel based upon said generated crisp value.

14. Apparatus according to claim 12, wherein said calculating means includes a fuzzy logic design for processing said memory utilization indication and said queue depth value to generate a crisp value corresponding to said window size.

15. A method for varying data channel window size to establish efficient use of a data channel, comprising the step of:

connecting a computer system to a network transferring data as packaged messages to and from said computer system and to and from said network through an input/output channel board having a buffer memory to hold said messages before being transmitted over said network, storing said packaged messages in said buffer memory in a message queue, determining a queue depth value indicative of the queue depth of messages loaded into said message queue, determining a buffer memory utilization value predication on the maximum queue depth and the numbers of said messages in said message queue, generating a first fuzzy logic input set corresponding to said queue depth value, generating a second from logic input set corresponding to said memory utilization value, generating a plurality of logic rule statements defining desired relationships between said first and said second fuzzy input sets, executing a fuzzy logic design corresponding to fuzzy logic input sets, and generating a crisp value corresponding to a desired window size for utilization by said computer system.

16. A method of varying data channel window size according to claim 15, wherein said memory utilization value is generated by said data channel.

17. A method of varying data channel window size according to claim 15, wherein said queue depth value is incremented each time one of said messages is added to said queue and decremented each time one of said messages is removed from said queue.

* * * * *